ably be described with relation to two specific embodi-

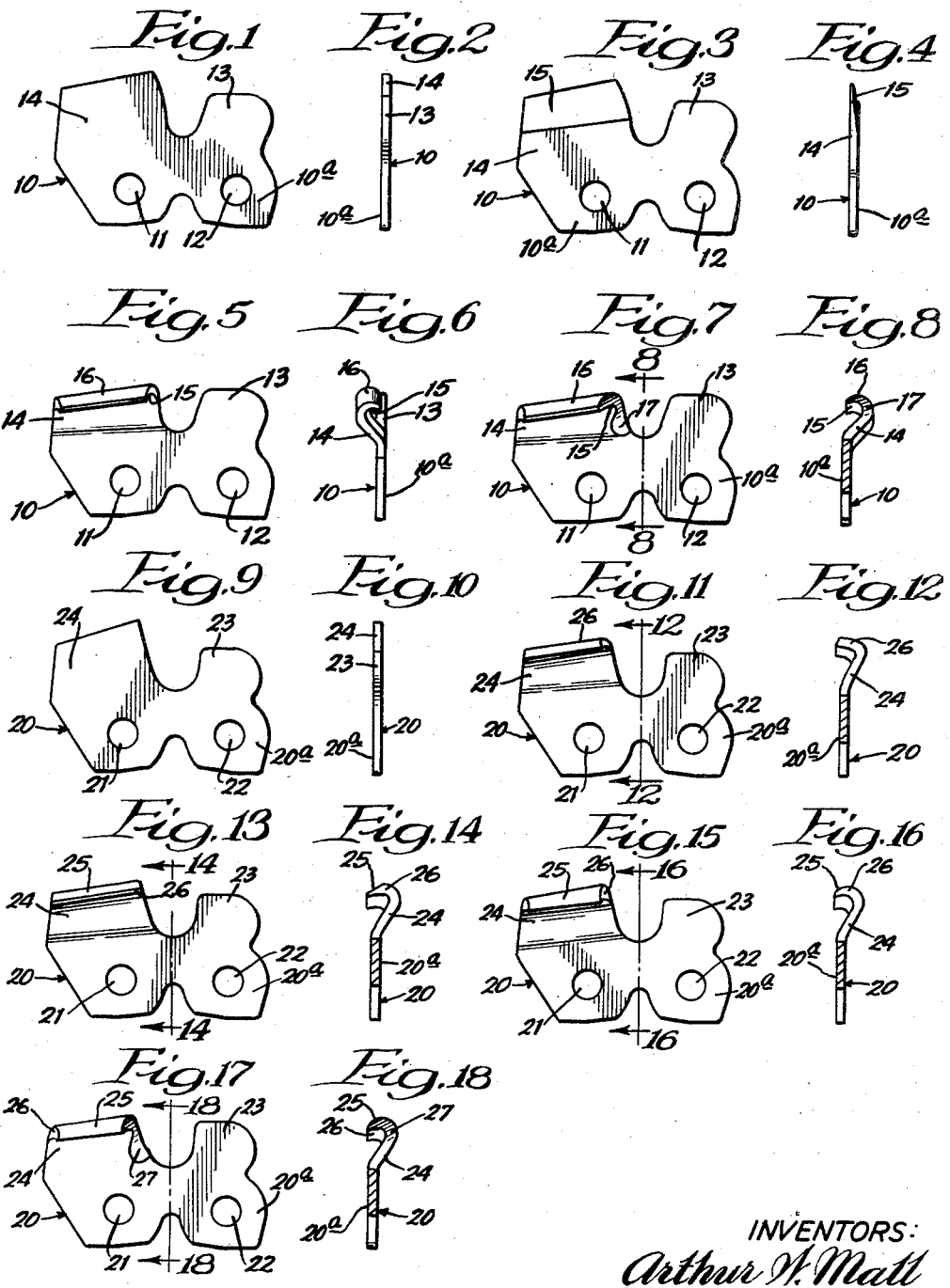

United States Patent Office 2,854,866
Patented Oct. 7, 1958

2,854,866

METHOD OF FORMING SAW CHAIN TEETH AND SAW CHAIN CUTTER LINKS

Arthur W. Mall, Flossmoor, and Robert G. Sholeen, Chicago Heights, Ill., assignors to Mall Tool Company, Chicago, Ill., a corporation of Illinois Application October 29, 1956, Serial No. 618,976

3 Claims. (Cl. 76—112)

This invention relates to a method of forming saw chain teeth and saw chain cutter links. More particularly, the invention is concerned with a method of forming a curved, tapered toe on a chain saw cutter link of the type adapted to provide a cutting tooth having a transversely-extending toe portion.

In commercial practice today, the predominant type of saw chain cutting teeth have their cutting edges provided on downwardly-extending shank portions in combination with transversely-extending toe portions. Such saw chain cutting teeth may be L-shaped, C-shaped, or some intermediate modification of these basic shapes. For the purpose of producing a cutting tooth of the general type just described, which slices cleanly and smoothly through the wood, it has been found desirable to taper the toes of the teeth toward their outer or free ends. This can be done rather readily where the form of the tooth is basically L-shaped and provides a flat toe for cutting along the bottom of the kerf. Heretofore, however, no method has been known for forming a C-shaped tooth or a tooth having a curved toe with the bottom-cutting portion or the curved toe having an appreciable taper toward its outer or free end. This has been a limiting factor on the use of saw chain teeth having curved toes, although the principle of using a smoothly curved cutting edge for wood cutting operations would indicate the superiority of this type of tooth.

It is therefore a general object of this invention to provide a method of forming a chain saw cutting tooth having a curved, tapered toe. Further objects and advantages will appear as the specification proceeds.

The invention is shown in two illustrative embodiments in the accompanying drawing, in which—

Figures 1 to 8 illustrate a sequence of four steps in forming chain saw tooth according to the present invention; and Figures 9 to 18 illustrate a sequence of five steps in forming chain saw tooth according to a modification of the method illustrated in Figures 1 to 8, which is also in accordance with the present invention. In the method embodiments just referred to, Figures 1 and 2, and Figures 9 and 10, illustrate the first steps, respectively, Figs. 3 and 4 and Figs. 11 and 12 the second step, and so on, the odd-numbered figures in each group showing the tooth from the side for each step and the even numbered figures are end views or end sectional views. More specifically, Figs. 2 and 10 are views of the right-hand ends of the link blanks of Figs. 1 and 9, respectively. Figs. 4 and 6 are views from the left-hand ends, respectively, of the intermediate link forms of Figs. 3 and 5. Figs. 8, 12, 14, 16 and 18 are end sectional views, respectively, of the intermediate or final link forms of Figs. 7, 11, 13, 15 and 17, the sections being taken, respectively, on lines 8—8, 12—12, and so forth, of the various figures.

As already indicated, this invention is concerned with a method of forming a curved, tapered toe on a chain saw cutter link of the type adapted to provide a cutting tooth having a transversely-extending toe portion. Pursuant to the method of this invention, as will subsequently be described with relation to two specific embodiments thereof, the following steps are characteristic. As one step of the method, a flat, inclined surface is ground on the toe-providing portion of the cutter link, the surface being ground to provide an appreciable taper toward the outer end of the toe-providing portion. Then, in a subsequent step, the ground toe-providing portion is formed in a die. In this last-mentioned step, the toe-providing portion and the ground surface thereon are die-formed to provide appreciable curvature across the full extent of the toe-providing portion.

Attention is now directed particularly to Figs. 1 to 8 of the drawing. Looking first at Figs. 1 and 2, there is shown a die-cut steel blank 10 having rivet holes 11 and 12, a depth gauge tooth portion 13 and an upwardly-extending section 14 out of which the cutting tooth will be subsequently formed. The preferred next step is shown in Figs. 3 and 4. In this step, a flat, inclined surface 15 is ground on the toe-providing portion 14 of cutter link 10. As illustrated in Figs. 3 and 4, this ground surface 15 is formed, that is, the grinding step is carried out, while the toe-providing portion 14 is aligned with the body of link 10. As shown more clearly in Fig. 4, surface 15 is formed so that the toe-providing portion 14 has an appreciable taper toward its outer end. Preferably, surface 15 is formed on the inside face, being face 10a in the illustration given, of the cutter link, so that when the tooth is formed, surface 15 will be on the underside of the tooth. This is illustrated more clearly in the subsequent figures.

In the next step, as shown in Figs. 5 and 6, the cutter link 10 is subjected to a die-forming operation in which the upwardly-extending link portion 14 is bent over the ground surface 15 underneath to provide a transversely-extending toe portion 16. As shown more clearly in Fig. 6, it will be noted that the die-forming step has been carried out so that the toe 16 has an appreciable curvature across its full extent. This operation has also introduced a curvature into ground surface 15, this surface now being concavely-curved while the upper surface of toe 16 is convexly-curved. As a final step, in accordance with procedures well known in the art, the forward end of the tooth is sharpened, as indicated in Figs. 7 and 8. The beveled surface 17 provides a chisel-type cutting edge at the front of the tooth, and the cutting edge follows the curvature of the tooth around its side and top or toe portion. At the same time, the toe 16, which provides the metal supporting the cutting edge thereon, tapers substantially towards its free or outer end, as shown more clearly in Fig. 8.

Another embodiment of the method of this invention is illustrated in Figs. 9 to 18. The die-cut steel blank 20, as shown in Figs. 9 and 10, has rivet holes 21 and 22, depth gauge tooth portion 23 and the upwardly-extending section 24 out of which the cutting tooth will be subsequently formed. The blank 20 is then stamped in a die to form portion 24 with an upwardly-extending, generally flat toe 26, as shown in Figs. 11 and 12. The outer end of toe 26 is then ground off to form an outwardly and downwardly inclined flat area 25, as indicated in Figs. 13 and 14. The link 20 is then subjected to a second die-forming operation, as shown in Figs. 15 and 16, wherein the tooth-providing portion 24 is formed over further than previously, and in the same operation the flat upper surface 25 on toe 26 is reformed to a curved surface, as indicated more clearly in Fig. 16. The shaping of the tooth is then complete, except for the usual sharpening, as indicated in Figs. 17 and 18. The beveled surface 27 provides the chisel-type cutting edge at the front of the tooth. As shown in Fig. 18, the final tooth has a curved toe portion, which when sharpened at its forward end, provides a curved cutting edge, and the cutting edge is supported on the toe which tapers appreciably toward its outer or free end.

While the method of this invention has been described with reference to specific embodiments thereof and many details have been set forth for purpose of illustration, it will be apparent to those skilled in the art that the invention is susceptible to other embodiments and that many of the details described herein can be varied without departing from the basic principles of the invention.

We claim:

1. In a method of forming a curved, tapered toe on a chain saw cutter link of the type adapted to provide a cutting tooth having a transversely-extending toe portion, the steps comprising grinding a flat, inclined surface on the toe-providing portion of said cutter link while said toe-providing portion is aligned with the body of said link, said surface being ground to provide appreciable taper toward the outer end of said toe-providing portion, and, thereafter, forming said toe-providing portion in a die to provide a transversely-extending cutting tooth toe on said link with said ground surface underneath said toe, said toe-providing portion and the said ground surface thereon being die-formed at the same time to provide appreciable curvature across the full extent of said toe-providing portion.

2. In a method of forming a curved, tapered toe on a chain saw cutter link of the type adapted to provide a cutting tooth having a transversely-extending toe portion, the steps comprising forming the toe-providing portion of said cutter link in a die until it is at an obtuse angle with respect to the body of said link, grinding a flat, inclined surface on the top of said toe-providing portion at an acute angle with respect to the body of said cutter link, said surface being ground to provide appreciable taper toward the outer end of said toe-providing portion, and thereafter, forming the said toe-providing portion in a die for a second time, said toe-providing portion and the said ground surface thereon being die-formed in said second die-forming step to provide appreciable curvature across the full extent of said toe-providing portion.

3. In a method of forming a curved, tapered toe on a chain saw cutter link of the type adapted to provide a cutting tooth having a transversely-extending toe portion, the steps comprising grinding a flat, inclined surface on the toe-providing portion of said cutter link, said surface being ground to provide appreciable taper toward the outer end of said toe-providing portion, and, thereafter, forming said toe-providing portion in a die to provide a transversely-extending cutting toe on said link, said toe-providing portion and the said ground surface thereon being die-formed at the same time to provide appreciable curvature across the full extent of said toe-providing portion.

References Cited in the file of this patent

UNITED STATES PATENTS

| | | |
|---|---|---|
| 1,603,755 | Ericson | Oct. 19, 1926 |
| 2,533,648 | Warburg et al. | Dec. 12, 1950 |
| 2,713,276 | Siverson | July 19, 1955 |

FOREIGN PATENTS

| | | |
|---|---|---|
| 570,514 | Great Britain | Dec. 21, 1944 |